(12) United States Patent
Ito et al.

(10) Patent No.: US 10,124,518 B2
(45) Date of Patent: Nov. 13, 2018

(54) METHOD FOR MANUFACTURING DECORATIVE MOLDED ARTICLE

(71) Applicants: TOYODA GOSEI CO., LTD., Kiyosu-shi, Aichi-ken (JP); NISSHA PRINTING CO., LTD., Kyoto-shi, Kyoto (JP)

(72) Inventors: Tatsuo Ito, Kiyosu (JP); Takafumi Matsui, Kyoto (JP)

(73) Assignees: TOYODA GOSEI CO., LTD., Aichi-pref. (JP); NISSHA PRINTING CO., LTD., Kyoto (JP)

( * ) Notice: Subject to any disclaimer, the term of this patent is extended or adjusted under 35 U.S.C. 154(b) by 144 days.

(21) Appl. No.: 15/244,314

(22) Filed: Aug. 23, 2016

(65) Prior Publication Data
US 2017/0072607 A1    Mar. 16, 2017

(30) Foreign Application Priority Data

Sep. 16, 2015 (JP) ................................. 2015-183229

(51) Int. Cl.
*B29C 47/76* (2006.01)
*B29C 45/14* (2006.01)
(Continued)

(52) U.S. Cl.
CPC ........ *B29C 45/14262* (2013.01); *B29C 33/12* (2013.01); *B29C 45/1418* (2013.01);
(Continued)

(58) Field of Classification Search
CPC .......... B29C 45/14262; B29C 45/1418; B29C 45/14827; B29C 2045/14213; B29C 2045/14155; B29C 51/10
See application file for complete search history.

(56) References Cited

U.S. PATENT DOCUMENTS 3,673,295 A * 6/1972 Winchklhofer ....... B29C 51/004
156/84
2009/0179342 A1* 7/2009 Araujo ................ B29C 45/1418
264/161

FOREIGN PATENT DOCUMENTS

| JP | 2013-132826 A | 7/2013 |
| JP | 2013-146956 A | 8/2013 |
| JP | 2013-203068 A | 10/2013 |

OTHER PUBLICATIONS

M. L. Berins (ed.) SPI Plastics Engineering Handbook of the Society of the Plastics Industry, Inc, Van Nostrand Reinhold, Chapter 13—Thermoforming of Plastic Film and Sheet, 1991, pp. 383-427. (Year: 1991).*

* cited by examiner

*Primary Examiner* — Kelly M Gambetta
(74) *Attorney, Agent, or Firm* — Posz Law Group, PLC

(57) ABSTRACT

A method for manufacturing a decorative molded article includes first to fourth steps. In the first step, a plastic sheet is secured to a cavity block in a state in which first and second portions are arranged along an open end of a molding recess. The plastic sheet is tightly held by the cavity block and a securing member at the first portions and is not tightly held at the second portions. In the second step, the plastic sheet is deformed. In the third step, the plastic sheet is secured to the cavity block in a state in which the plastic sheet is tightly held by the cavity block and the securing member over the entire periphery of the opening of the molding recess. In the fourth step, the plastic sheet is molded by being caused to closely contact the molding surface of the cavity block through vacuum suction.

7 Claims, 10 Drawing Sheets

(51) Int. Cl.
*B29C 51/10* (2006.01)
*B29C 33/12* (2006.01)
B29K 667/00 (2006.01)
B29L 31/00 (2006.01)

(52) U.S. Cl.
CPC ........ *B29C 45/14827* (2013.01); *B29C 51/10* (2013.01); *B29C 2045/14213* (2013.01); *B29K 2667/003* (2013.01); *B29K 2995/0025* (2013.01); *B29K 2995/0026* (2013.01); *B29L 2031/722* (2013.01)

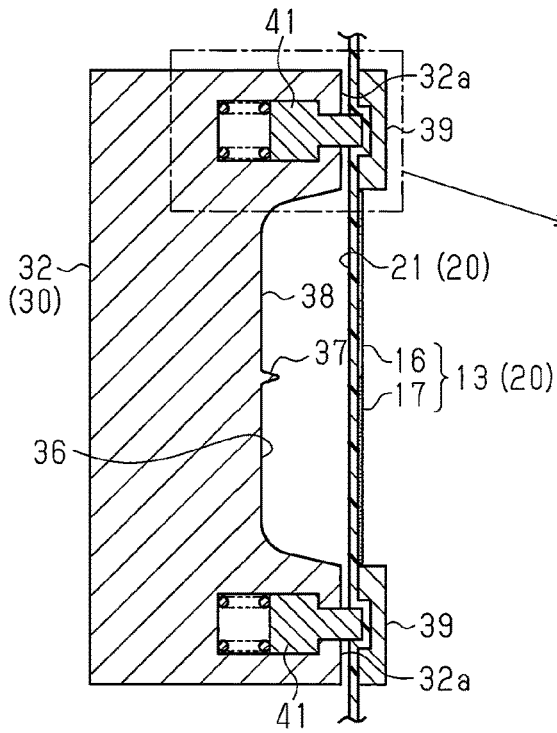
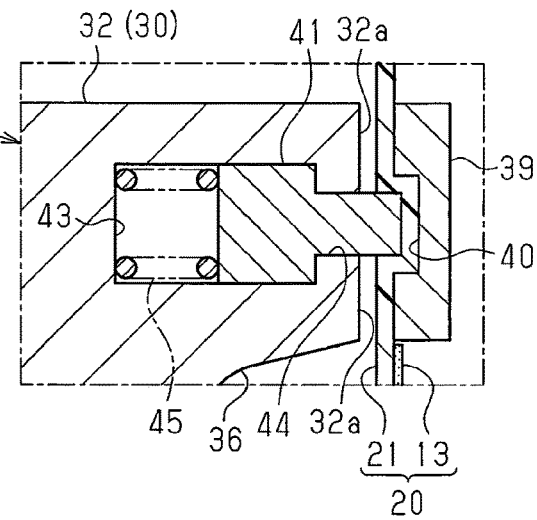
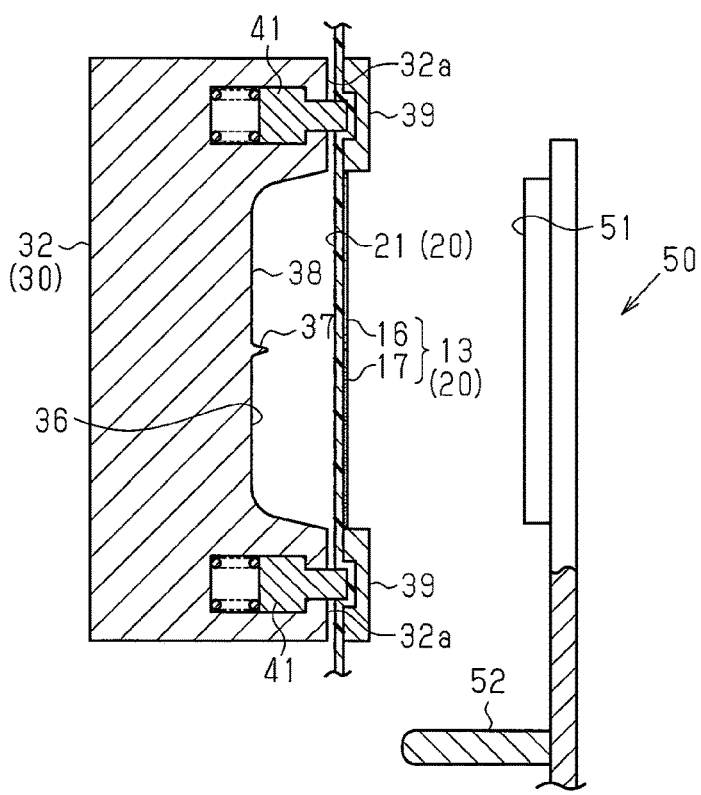

METHOD FOR MANUFACTURING DECORATIVE MOLDED ARTICLE

BACKGROUND OF THE INVENTION

The present invention relates to a method for manufacturing a decorative molded article that has a decorative design surface.

One method for manufacturing a decorative molded article is an in-mold decoration method (for example, refer to Japanese Laid-Open Patent Publication No. 2013-146956). In this method, a mold having a cavity block and a core block and a plastic sheet are used. The plastic sheet has a base sheet and a decorative design layer formed on the base sheet. The plastic sheet will hereafter be referred to as a film.

When manufacturing a decorative molded article using this method, the film is positioned relative to and secured to the cavity block in the opened mold. The film is then caused to closely contact the inner surface of the molding cavity (a molding surface) of the cavity die by vacuum suction. Thereafter, the body of an article body is molded by injecting molten plastic into a cavity, which is defined between the film and the core surface of the core block while the mold is clamped. In the molding process of the article body, the decorative design layer of the film is transferred (adhered) to the design surface of the article body. As a result, the obtained decorative molded article includes a decorative design layer decorating the design surface of the article body.

In the manufacturing method disclosed in Japanese Laid-Open Patent Publication No. 2013-146956, the film secured to the cavity block is pushed prior to the vacuum suction, so that the film is deformed to have a shape close to the molding surface of the cavity die. Thus, compared to a case in which a film is subjected to vacuum suction without being deformed in advance, the amount of movement of parts of the film is reduced in the vacuum suction. This limits positional displacement between the molding surface the cavity block and the decorative design layer when the vacuum suction is applied. As a result, the obtained decorative molded article includes a decorative design on the design surface formed with great positional accuracy.

In the above described manufacturing method, to properly change the shape of the film through vacuum suction, the film is caused to closely contact the opening periphery of the molding recess of the cavity block prior to the vacuum suction. This seals the space defined by the molding surface of the cavity block and the film. Thus, if, in this state, the film is pushed to cause the film to approach the molding surface of the cavity block, parts of the film that are not pushed bulge, and the film is deformed into an unintended shape. Such an unintended deformation of the film causes positional displacement of the film (the decorative design layer) relative to the molding surface of the cavity block. This degrades the accuracy of the positions of the design on the design surface of the decorative molded article.

Such drawbacks are not limited to the above described method for manufacturing a decorative molded article by the in-mold decoration, but are generally common to methods for molding at least a part of a decorative molded article by vacuum suction using a plastic sheet such as a film. For example, the drawbacks are found in a method for manufacturing a decorative molded article with a decorative design surface by a film insert molding or vacuum molding.

SUMMARY OF THE INVENTION

Accordingly, it is an objective of the present invention to provide a method for manufacturing a decorative molded article that improves the accuracy of the position of the design on the design surface of a decorative molded article.

To achieve the foregoing objective and in accordance with one aspect of the present invention, a method for manufacturing a decorative molded article that has a decorative design surface is provided. The method uses a plastic sheet having a decorative portion and a mold including a cavity block with a molding recess and a securing member configured to secure the plastic sheet to the cavity block. An inner surface of the molding recess configures a molding surface. The method includes: a first step for positioning the plastic sheet at a preset position covering an opening of the molding recess and securing the plastic sheet to the cavity block in a state in which first portions and second portions are arranged along an open end of the molding recess, wherein the plastic sheet is tightly held by the cavity block and the securing member at each first portion and is not tightly held by the cavity block and the securing member at each second portion; a second step for pushing the plastic sheet to deform the plastic sheet toward the molding surface of the cavity block; a third step for securing the plastic sheet to the cavity block in a state in which the plastic sheet is tightly held by the cavity block and the securing member over an entire periphery of the opening of the molding recess along the open end of the molding recess; and a fourth step for molding the plastic sheet by causing the plastic sheet to closely contact the molding surface of the cavity block through vacuum suction.

BRIEF DESCRIPTION OF THE DRAWINGS

FIG. 8A is an explanatory cross-sectional view of the first step.

FIG. 8B is an enlarged partial cross-sectional view showing a part of FIG. 8A.

FIG. 9 is an explanatory partial cross-sectional view showing a heating step.

DETAILED DESCRIPTION OF THE PREFERRED EMBODIMENTS

Figure 1:
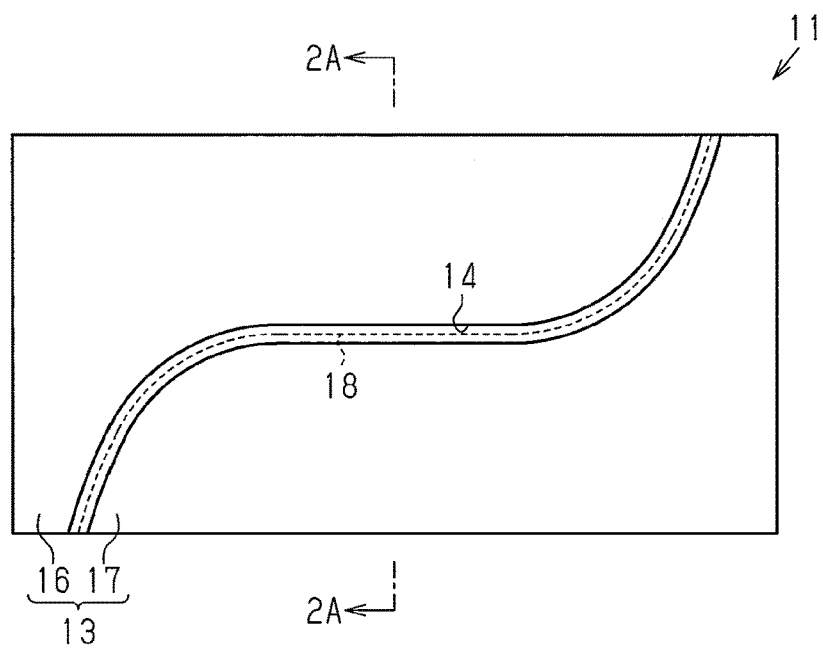
FIG. 1 is a side view schematically showing a decorative molded article manufactured by a decorative molded article manufacturing method according to one embodiment.

A method for manufacturing a decorative molded article according to one embodiment of the present invention will now be described with reference to the drawings.

The dimensional ratios in the drawings are exaggerated for illustrative purposes and are not actual ratios.

First, a decorative molded article obtained through the manufacturing method according to the present embodiment will be described.

Figure 2A:
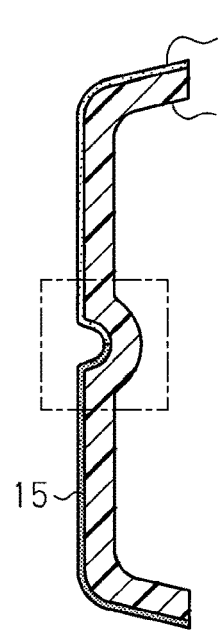
FIG. 2A is a cross-sectional view taken along line 2A-2A of the decorative molded article shown in FIG. 1.

As shown in FIGS. 1 and 2A, the decorative molded article 11 is embodied, for example, as an interior part for vehicles. The decorative molded article 11 includes an article body 12 and a decorative design layer 13. The article body 12 is made of plastic using injection molding. The article body 12 has a groove portion 14 in the surface portion. A part of the outer surface of the article body 12 configures a design surface 15. The inner wall surface of the groove portion 14 also configures a part of the design surface 15.

Figure 2B:
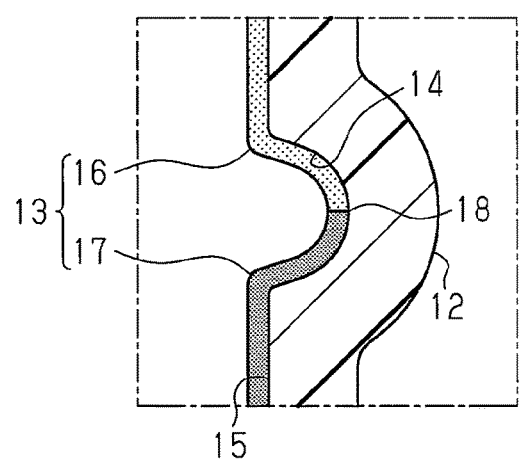
FIG. 2B is an enlarged partial cross-sectional view showing a part of FIG. 2A.

As shown in FIGS. 2A and 2B, the decorative design layer 13 is formed on the design surface 15 of the article body 12 to decorate the design surface 15. The decorative design layer 13 is configured by two different first and second design portions 16, 17, which are adjacent to each other. The decorative design layer 13 is formed substantially over the entire design surface 15 of the article body 12 with a boundary 18 between the first and second design portions 16, 17 located on the inner wall surface of the groove portion 14.

To manufacture the decorative molded article 11, a plastic sheet, which is a film 20, and a mold 30 are used.

Figure 3:
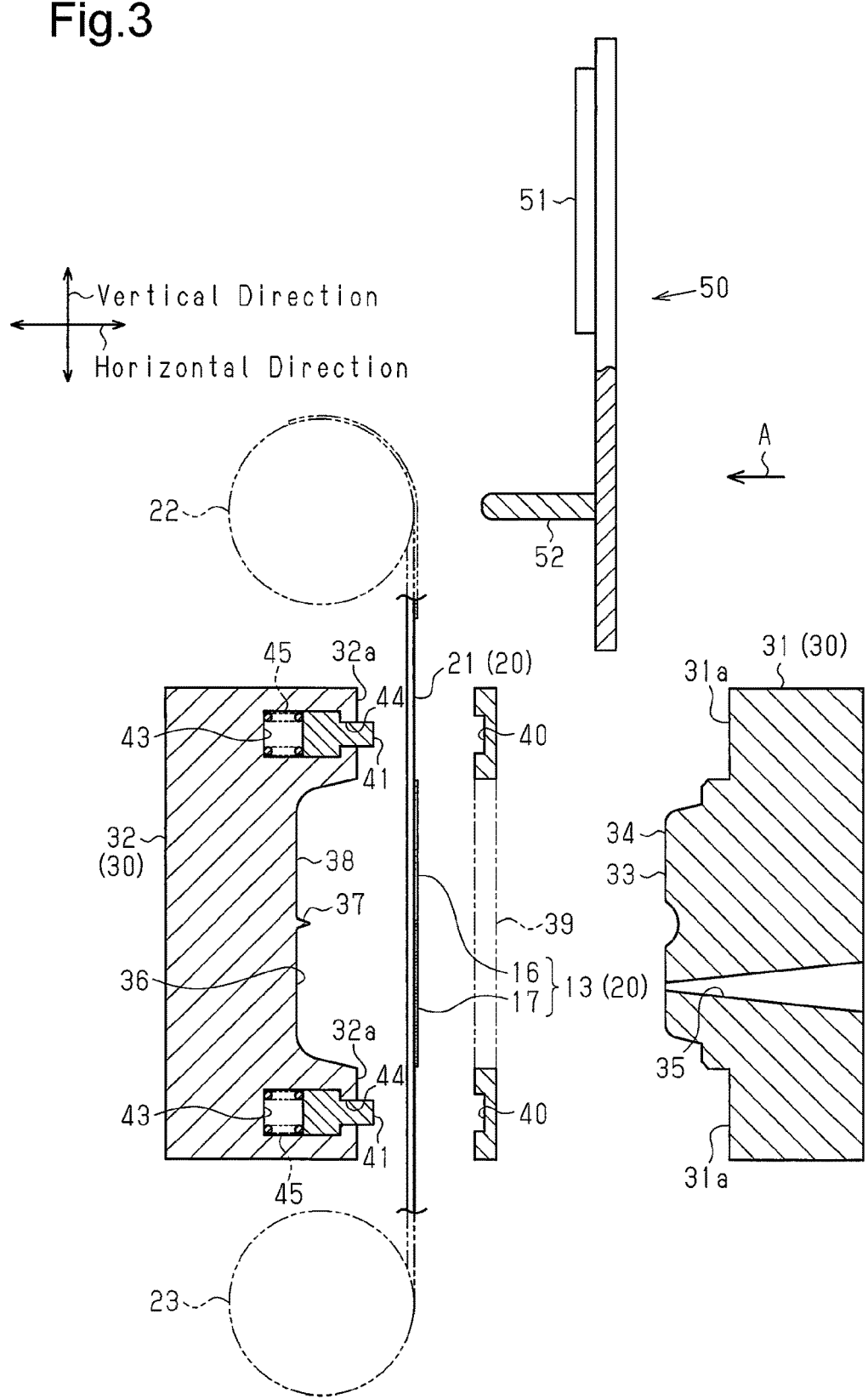
FIG. 3 is a diagram schematically showing the structure of an apparatus for manufacturing the decorative molded article of FIG. 1.

As shown in FIG. 3, the main part of the film 20 is configured by an elongated base film 21, which is made of plastic. The base film 21 may be transparent or opaque. The plastic for the base film 21 may be any type as long as it has thermal plasticity. In the present embodiment, polyethylene terephthalate (PET) is used as the plastic. The base film 21 may have a single layer structure or a laminated structure.

The decorative design layer 13 is formed on the base film 21 using a printing method such as gravure printing, vapor deposition, or the like to be peelable at predetermined intervals in the longitudinal direction of the base film 21. Each of the first and second design portions 16, 17 of the decorative design layer 13 has, for example, a wood-grain pattern, a stone pattern, a sand pattern, a metallic pattern, a geometric pattern, an abstract pattern, and the like. The first and second design portions 16, 17 may include characters, symbols, and the like. Marks for positioning (not shown) are formed on the base film 21 through printing for a plurality of decorative design layers 13 at positions different from the positions of the decorative design layers 13.

The film 20 is rolled up to form a roll 22 such that the base film 21 is inside and the decorative design layer 13 is outside. The roll 22 of the film 20 is arranged above and near the mold 30. A winder 23 is arranged below and near the mold 30 to reel in the base film 21, from which the decorative design layer 13 has been peeled off.

The mold 30 includes a core block 31 and a cavity block 32. In the present embodiment, the core block 31 is a fixed block, and the cavity block 32 is a movable block. That is, the cavity block 32 is moved horizontally (in the lateral direction in FIG. 3) to approach or separate away from the core block 31.

A part of the core block 31 that is opposed to the cavity block 32 includes a molding projection 33, which projects toward the cavity block 32, and an end face 31a. The surface of the molding projection 33 and a portion of the end face 31a around the molding projection 33 constitute a core surface 34. The core block 31 includes a sprue gate 35, which has an open end in the distal end surface of the molding projection 33.

In contrast, a portion of the cavity block 32 that is opposed to the core block 31 includes a molding recess 36. The molding recess 36 has in a part a protrusion 37 for molding the groove portion 14 of the article body 12. The protrusion 37 protrudes toward the molding projection 33. The inner wall surface of the molding recess 36 including the surface of the protrusion 37 constitutes a molding surface 38.

The molding surface 38 of the cavity block 32 has a function as a shaping surface for shaping the film 20 into a predetermined shape and a function as a shaping surface for molding molten plastic into the article body 12 having a predetermined shape. The cavity block 32 has a number of fine vacuum suction holes (not shown) that is open in the molding surface 38. The vacuum suction holes are connected to a vacuum pump (not shown).

Figure 4:
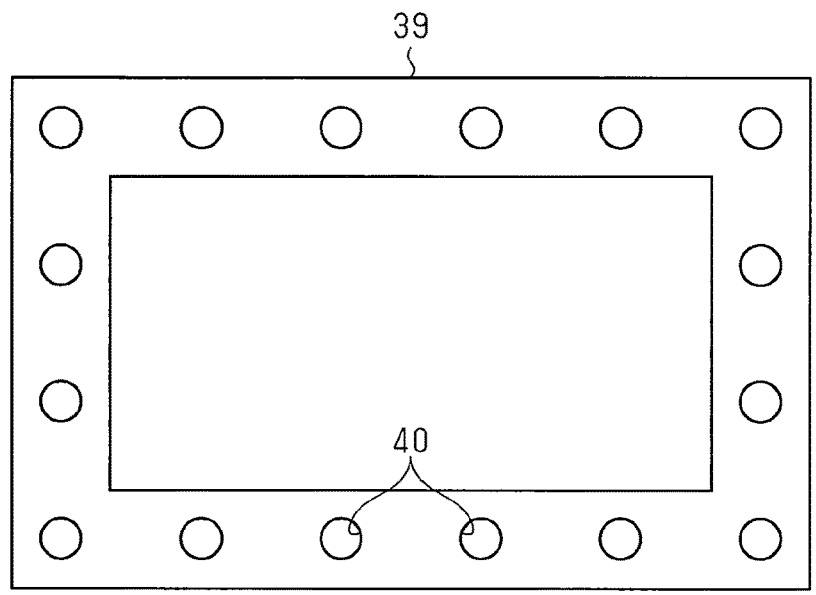
FIG. 4 is a side view of the clamp of the apparatus shown in FIG. 3.

As shown in FIGS. 3 and 4, the cavity block 32 is provided with a clamp 39, which serves a securing member. The clamp 39 secures the film 20 to the cavity block 32 by tightly holding the film 20 with the clamp 39 and the cavity block 32, or with the clamp 39 and the distal ends of securing pins 41, which will be discussed below. The clamp 39 is shaped such that, when the film 20 is tightly held by the clamp 39 and the cavity block 32, the clamp 39 surrounds the entire periphery of the opening of the molding recess 36 along the open end of the molding recess 36 of the cavity block 32. Specifically, the clamp 39 has a rectangular loop-shaped structure forming the four sides of a rectangle.

The clamp 39 has recesses 40 in a part that is opposed to the cavity block 32. The recesses 40 are arranged at intervals along the open end of the molding recess 36 of the cavity block 32. In the present embodiment, the number of the recesses 40 is sixteen. The recesses 40 each have a circular cross-sectional shape.

The surface of the cavity block 32 that is opposed to the clamp 39 forms an opposed surface 32a. The cavity block 32 is provided with a driving mechanism (not shown), which moves the clamp 39 toward the opposed surface 32a or away from the opposed surface 32a.

Figure 5:
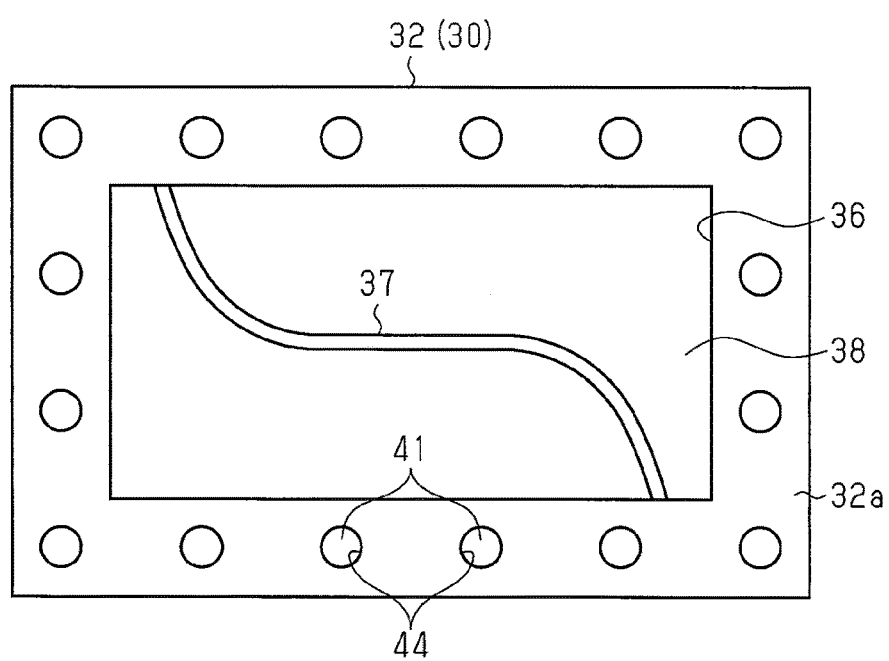
FIG. 5 is a side view of the cavity block of the apparatus shown in FIG. 3.
Figure 6:
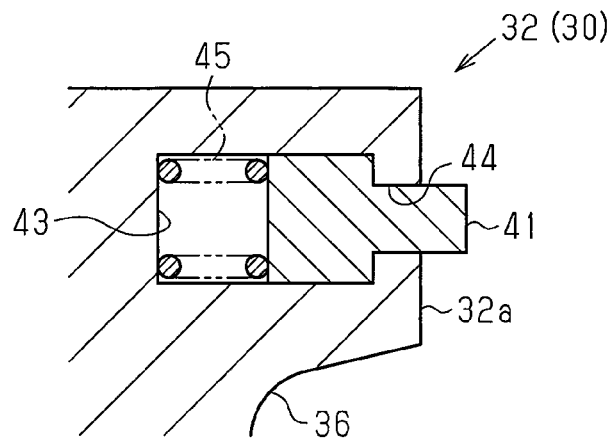
FIG. 6 is a cross-sectional view of a part of the cavity block shown in FIG. 5 where a securing pin is arranged.

As shown in FIGS. 5 and 6, the cavity block 32 has securing pins 41. The securing pins 41 are provided at a part of the opening periphery of the molding recess 36, which is opposed to the clamp 39, and are arranged at intervals along the open end of the molding recess 36. In the present embodiment, the number of the securing pins 41 is sixteen. The securing pins 41 are configured to change the projecting amount from the opposed surface 32a of the cavity block 32.

Specifically, the cavity block 32 has accommodation spaces 43 and communication holes 44. The accommodation spaces 43 are provided in a part of the opening periphery of the molding recess 36, which is opposed to the clamp 39. Each communication hole 44 connects the inside of an accommodation space 43 with the outside. Each accommodation space 43 extends in the clamping direction of the mold 30 (in the lateral direction in FIGS. 5 and 6) and has a circular cross-sectional shape. The securing pins 41 each have a columnar shape. Each securing pin 41 is accommodated in an accommodation space 43 to be movable in the clamping direction of the mold 30 such that the distal end of the securing pin 41 protrudes to the outside of the accommodation space 43 via one of the communication holes 44. Each accommodation space 43 accommodates a spring 45. The spring 45 serves as an urging member that always urges the securing pin 41 in a direction of increasing the projecting amount of the securing pin 41 from the opposed surface 32a of the cavity block 32. When pushed at the distal end, each securing pin 41 can be moved in a direction of decreasing the projecting amount from the opposed surface 32a of the cavity block 32 against the urging force of the spring 45.

As shown in FIG. 3, when the film 20 is secured to the cavity block 32 with the clamp 39, the distal ends of the securing pins 41 abut against the clamp 39 with the film 20 in between. The recesses 40 in the clamp 39 are arranged at positions against which the securing pins 41 abut with the film 20 in between. The shape of the distal ends of the securing pins 41 and the shape of the recesses 40 are determined such that the distal ends of the securing pins 41 can enter and exit the recesses 40.

Further, as shown in FIG. 3, a movable member 50 is provided in the vicinity of the mold 30. The movable member 50 is provided separately from the cavity block 32 and the core block 31 to be movable vertically and horizontally.

The movable member 50 has a heater 51, which generates heat when energized, on the side corresponding to the cavity block 32. The heater 51 is configured to heat and soften the film 20.

The movable member 50 also has a pushing portion 52 on the surface corresponding to the cavity block 32 at a position different from the heater 51. The pushing portion 52 protrudes toward the molding surface 38 of the cavity block 32, more specifically, toward the protrusion 37. The pushing portion 52 is configured such that the shape of the distal end portion of the pushing portion 52 as viewed from the side corresponding to the core block 31 (from the direction of arrow A in FIG. 3) substantially agrees with the shape of the protrusion 37 of the cavity block 32 as viewed from the side corresponding to the core block 31. When the movable member 50 is moved toward the cavity block 32, so that the pushing portion 52 pushes the film 20, the film 20 is pressed against the protrusion 37 over the entire length of the protrusion 37.

Operation

Next, as operation of the present embodiment, a method for manufacturing the decorative molded article 11 will be described with reference to FIGS. 7 to 15.

In the present embodiment, the decorative molded article 11 is manufactured through a first step, a heating step, a second step, a third step, a fourth step, a fifth step, and a demolding step. Each of these steps will be described separately.

<First Step>

Figure 7:
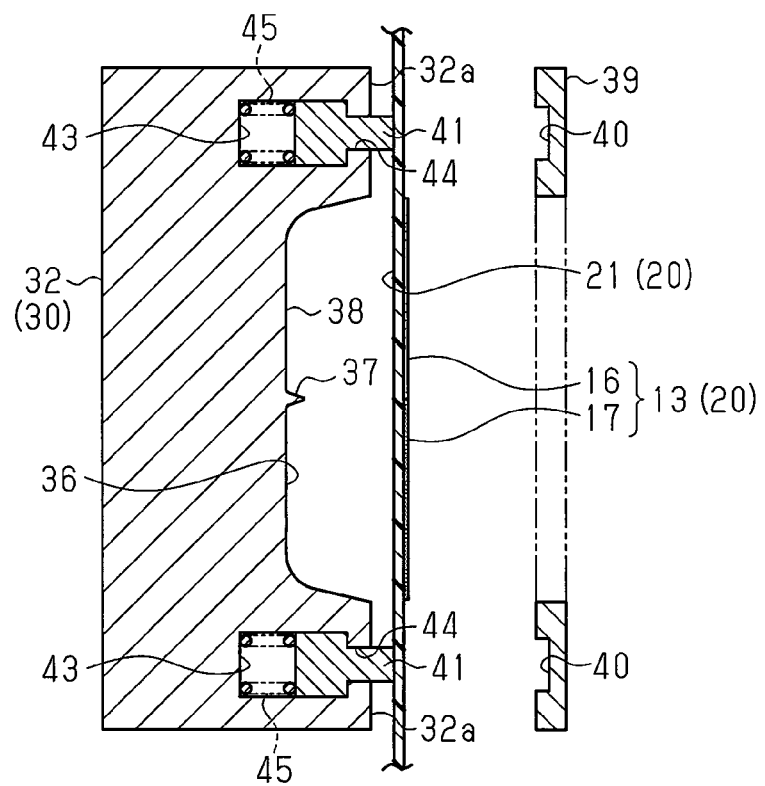
FIG. 7 is an explanatory cross-sectional view of a first step.

First, in the first step, the winder 23 (see FIG. 3) is activated with the mold 30 open, so that the film 20 (specifically, the part that will be secured to the cavity block 32) is fed to the position between the cavity block 32 and the clamp 39 as shown in FIG. 7. The operation of the winder 23 is stopped when the decorative design layer 13 of the film 20 reaches a preset position. That is, the decorative design layer 13 is positioned with respect to the cavity block 32. The preset position is previously determined as a position at which the decorative design layer 13 of the film 20 covers the opening of the molding recess 36 of the cavity block 32. For example, a sensor detects a positioning mark to position the decorative design layer 13. The film 20 is arranged such that the base film 21 is located on the side corresponding to the cavity block 32 and the decorative design layer 13 is located on the side corresponding to the core block 31.

As shown in FIGS. 8A and 8B, the clamp 39 is moved to a first securing position, at which the distance between the clamp 39 and the opposed surface 32a of the cavity block 32, which is opposed to the clamp 39, is greater than the thickness of the film 20.

After the clamp 39 is moved to the first securing position, the distance between the clamp 39 and the opposed surface 32a of the cavity block 32 is greater than the thickness of the film 20. Thus, the film 20 is not tightly held by the opposed surface 32a of the cavity block 32 and the clamp 39. The urging force of the springs 45 causes the securing pins 41 to project from the opposed surface 32a by a great projecting amount (the state shown in FIG. 8), so that the distal ends of the securing pins 41 are pressed against the clamp 39 with the film 20 in between. At this time, the film 20 is tightly held by the cavity block 32 and the clamp 39 at positions where the securing pins 41 are provided, more specifically, by the distal ends of the securing pins 41 and the clamp 39. However, at positions where the securing pins 41 are not provided, the film 20 is not tightly held by the cavity block 32 and the clamp 39. Thus, in the first step, the film 20 is secured to the cavity block 32 such that parts that are tightly held by the cavity block 32 (the distal ends of the securing pins 41) and the clamp 39 (first portions) and parts that are not tightly held by the cavity block 32 and the clamp 39 (second portions) are arranged alternately along the open end of the molding recess of the cavity block 32. At the parts at which the film 20 is not tightly held by the securing pins 41 and the clamp 39 (second portions), clearances are formed between the film 20 and the opposed surface 32a of the cavity block 32.

In the present embodiment, the distal ends of the securing pins 41 enter the recesses 40 of the clamp 39 while deforming the film 20 when the film 20 is tightly held by the distal ends of the securing pins 41 and the clamp 39 in the first step. Accordingly, the distal ends of the securing pins 41 and the clamp 39, specifically, the distal ends of the securing pins 41 and the bottoms of the recesses 40, tightly hold the film 20. Further, the deformed parts of the film 20 are engaged with the outer surfaces of the securing pins 41 and the inner surfaces of the recesses 40. Therefore, compared to a case in which the film 20 is not engaged with the outer surfaces of the securing pins 41 and the inner surfaces of the recesses 40, the position of the film 20 is reliably restricted from being displaced with respect to the cavity block 32.

<Heating Step>

In the heating step performed after the first step, the movable member 50 is moved to allow the heater 51 of the movable member 50 to heat the film 20 as shown in FIG. 9. Specifically, with the mold 30 remaining opened, the movable member 50 is moved downward from the standby position (the position shown in FIG. 3) to a position at which the height of the heater 51 of the movable member 50 agrees with the height of the molding recess 36 of the cavity block 32. At this time, the heater 51 is energized and heated, so that the film 20 is heated by the heated heater 51. This heating by the heater 51 softens the film 20, and the film 20 becomes stretchy.

<Second Step>

In the second step performed after the heating step, the movable member 50 is moved such that the pushing portion 52 of the movable member 50 (see FIG. 3) pushes the film 20. Specifically, the movable member 50 is moved to a position at which the height of the distal end of the pushing portion 52 of the movable member 50 agrees with the height of the protrusion 37 of the cavity block 32. Thereafter, the movable member 50 is moved toward the cavity block 32 (toward the left side in FIG. 3).

Figure 10:
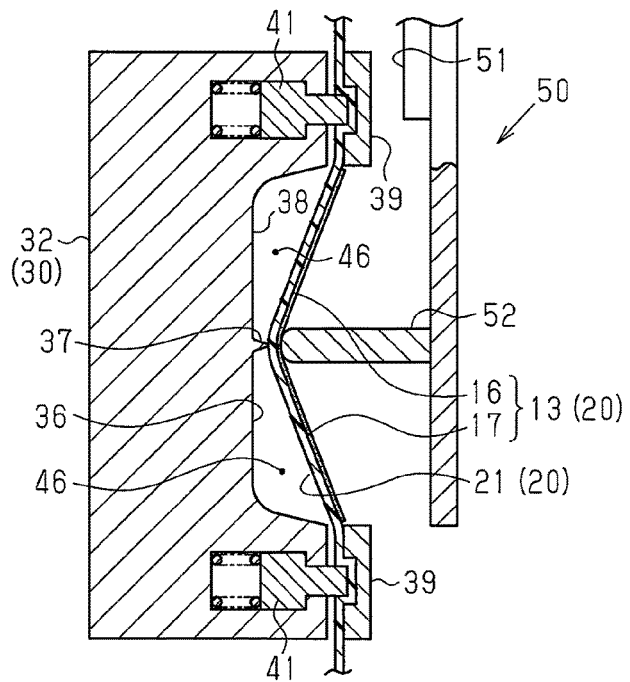
FIG. 10 is an explanatory partial cross-sectional view of a second step.

As the movable member 50 is moved, the pushing portion 52 is moved toward the cavity block 32, so that the film 20 is pushed by the distal end of the pushing portion 52 toward the cavity block 32 at the boundary 18 between the first and second design portions 16, 17. At this time, although stretched, the base film 21 is not easily moved relative to the pushing portion 52 since the base film 21 is being pushed by the pushing portion 52. The same applies to the decorative design layer 13, and the boundary 18 of decorative design layer 13 is not easily moved relative to the pushing portion 52. By being pushed by the pushing portion 52, the film 20 approaches the molding surface 38 while maintaining the position relative to the pushing portion 52 and being stretched. Then, as shown in FIG. 10, the film 20 is pressed against a part of the molding surface 38 of the cavity block 32, specifically, against the protrusion 37.

In the second step, the film 20 is secured to cover the opening of the molding recess 36 of the cavity block 32, while being tightly held by the distal ends of the securing pins 41 and the clamp 39. However, the film 20 has parts (second portions) that are not tightly held by the cavity block 32 and the clamp 39 at the opening periphery of the molding recess 36 of the cavity block 32. In such parts, the cavity block 32 and the film 20, specifically, the opposed surface 32a and the film 20 do not closely contact each other. Thus, if the internal pressure in a space 46 defined by the film 20 and the molding surface 38 of the cavity block 32 increases when the film 20 is pushed to be deformed, clearances are formed between the cavity block 32 and the film 20 at the parts (second portions) at which the film 20 is not tightly held by the cavity block 32 and the clamp 39. Through the clearances, the air in the space 46 is discharged to the outside. Therefore, in the second step, when the film 20 is pushed to be deformed, the influence of the air filling the space 46 is reduced, so that the film 20 can be deformed in a desirable manner. This reduces displacement of the film 20 relative to the molding surface 38 of the cavity block 32.

Also, in the present embodiment, prior to the second step for pushing the film 20, the film 20 is heated by the heater 51 so that the film 20 is softened to be stretchy. Thus, the film 20 is stretched effortlessly by being pushed by the pushing portion 52 and is caused to closely contact the molding surface 38 of the cavity block 32. In the present embodiment, the molding recess 36 of the cavity block 32 is deep and the film 20 needs to be greatly stretched to closely contact the molding surface 38. Thus, heating and softening the film 20 is effective.

<Third Step>

Figures 11A, 11B:
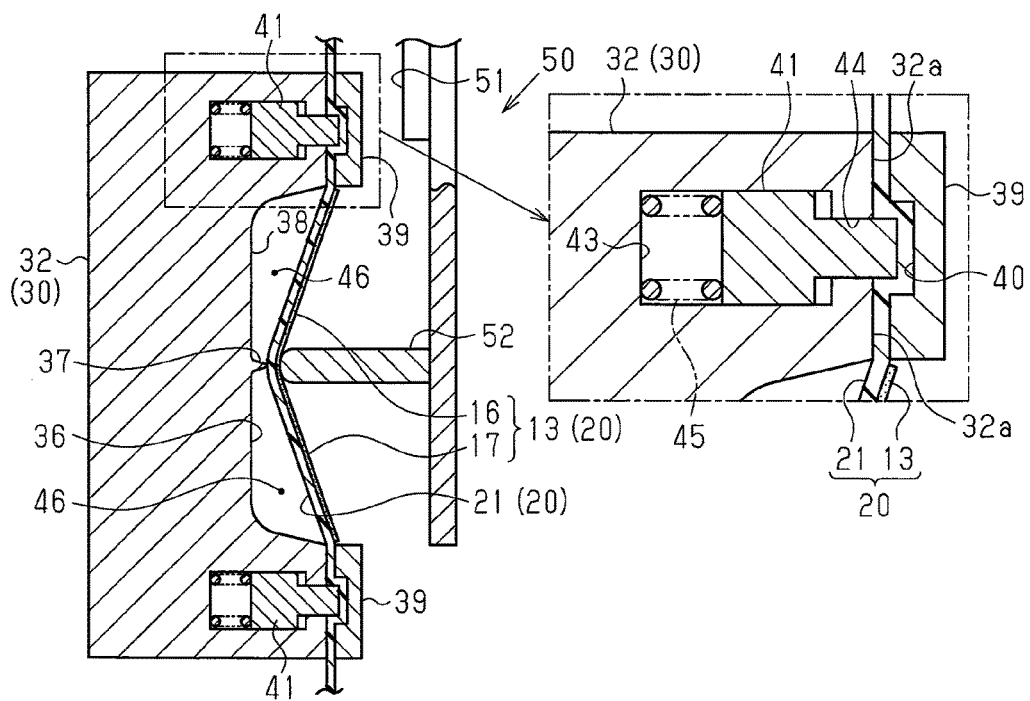
FIG. 11A is an explanatory cross-sectional view of a third step.
FIG. 11B is an enlarged partial cross-sectional view showing a part of FIG. 11A.

In the third step performed after the second step, as shown in FIGS. 11A and 11B, the clamp 39 is moved to a second securing position where the distance between the clamp 39 and the opposed surface 32a of the cavity block 32 is less than the thickness of the film 20. Specifically, the clamp 39 is moved to the second securing position, where the distance between the clamp 39 and the opposed surface 32a of the cavity block 32 is less than the thickness T of the base film 21 before being tightly held between the opposed surface 32a and the clamp 39 in the third step.

After the clamp 39 is moved, the distance between the clamp 39 and the opposed surface 32a of the cavity block 32 is less than the thickness T. Thus, although the securing pins 41 are provided at positions in the cavity block 32 that are opposed to the clamp 39, the distal ends of the securing pins 41 are pushed by the clamp 39 with the film 20 in between, and the securing pins 41 enter the accommodation spaces 43 against the urging force of the springs 45. Accordingly, the projecting amount of each securing pin 41 from the opposed surface 32a is less than that in the first step (refer to FIGS. 6B and 11B). Thus, the film 20 is tightly held by the clamp 39 and the opposed surface 32a of the cavity block 32. The film 20 closely contacts the cavity block 32 and the clamp 39 over the entire periphery of the opening of the molding recess 36 along the open end of the molding recess 36 of the cavity block 32. This seals the space 46 defined by the molding surface 38 of the cavity block 32 and the film 20.

As described above, in the third step, the film 20 is secured to the cavity block 32 while sealing the space 46, which is defined by the film 20 and the molding surface 38 of the cavity block 32. In the third step, the movable member 50 is held in a state in which the pushing portion 52 pushes the film 20.

<Fourth Step>

Figure 12:
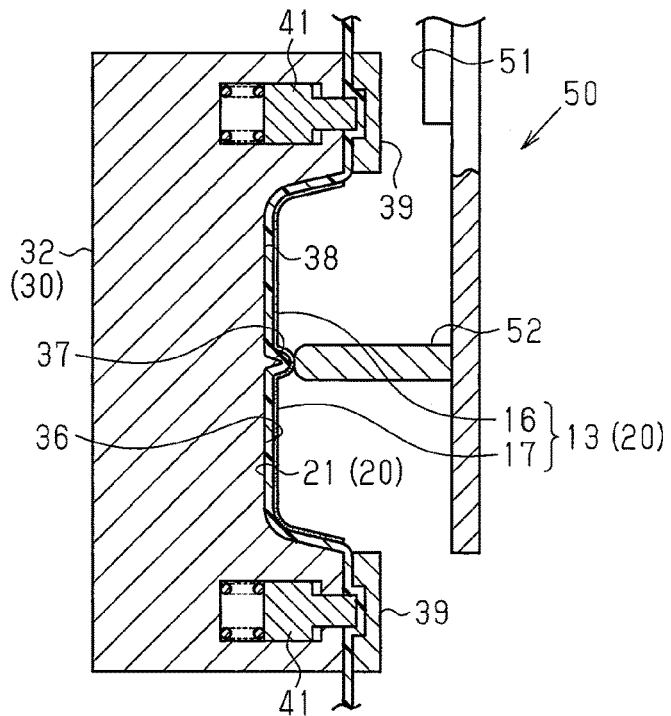
FIG. 12 is an explanatory cross-sectional view of a fourth step.

In the fourth step performed after the third step, vacuum suction by the vacuum pump is started to lower the pressure in the space 46. The film 20 is drawn toward the cavity block 32 and is stretched. Then, as shown in FIG. 12, the film 20 is caused to closely contact the molding surface 38 and is formed into a shape conforming to the molding surface 38 (preforming).

In the present embodiment, the film 20 and the opposed surface 32a of the cavity block 32 closely contact each other over the entire periphery of the opening of the molding recess 36 of the cavity block 32. This restricts inflow of air from the outside into the space 46, which is defined by the film 20 and the molding surface 38 of the cavity block 32, through the clearances between the film 20 and the cavity block 32. Accordingly, since the molding of the film 20 through vacuum suction is properly performed, the film 20 can be formed into a desirable shape while reducing displacement of the film 20 relative to the molding surface 38 of the cavity block 32.

At this time, the movable member 50 is held in a state in which the pushing portion 52 pushes the film 20. Thus, a part of the film 20 that is pressed against the molding surface 38 of the cavity block 32 by the pushing portion 52, that is, the boundary 18 between the first and second design portions 16, 17, which are adjacent to each other, is restricted from being moved from its position. Therefore, unlike a case in which the film 20 is subjected to vacuum suction while being simply placed close to the molding surface 38 of the cavity block 32, that is, without being pressed against the molding surface 38, the boundary 18 is unlikely to be moved relative to the pushing portion 52 by the entire film 20 closely contacting the molding surface 38. The film 20 is thus unlikely to be displaced by the entire film 20 closely contacting the molding surface 38.

Further, in the present embodiment, prior to the fourth step for molding the film 20 by vacuum suction, the film 20 is heated by the heater 51 so that the film 20 is softened to be stretchy. Thus, the film 20 is stretched effortlessly by being subjected to vacuum suction in the fourth step and is caused to closely contact the molding surface 38 of the cavity block 32.

<Fifth Step>

Figure 13:
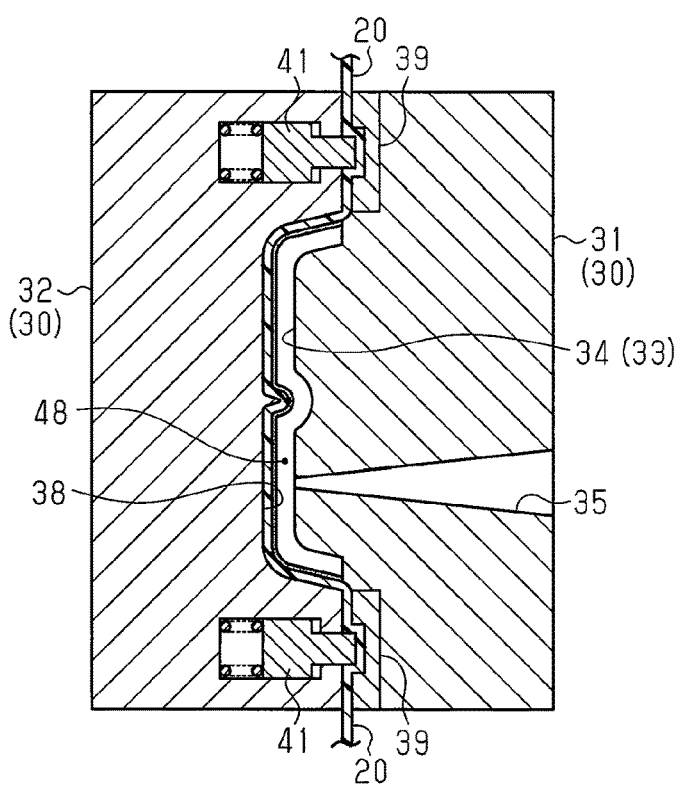
FIG. 13 is an explanatory cross-sectional view of a fifth step.

Subsequently, in the fifth step performed after the fourth step, when the film 20 is caused to closely contact the molding surface 38, the movable member 50 is retracted to the standby position (the position shown in FIG. 3), which is outside the mold 30. Then, the mold 30 is clamped as shown in FIG. 13. The clamping is performed by moving the cavity block 32 toward the core block 31 (toward the right side as viewed in FIG. 3). Through the clamping, a part of the film 20 that closely contacts the molding surface 38 of the cavity block 32 and the core surface 34 of the core block 31 define a cavity 48 in between.

Figure 14:
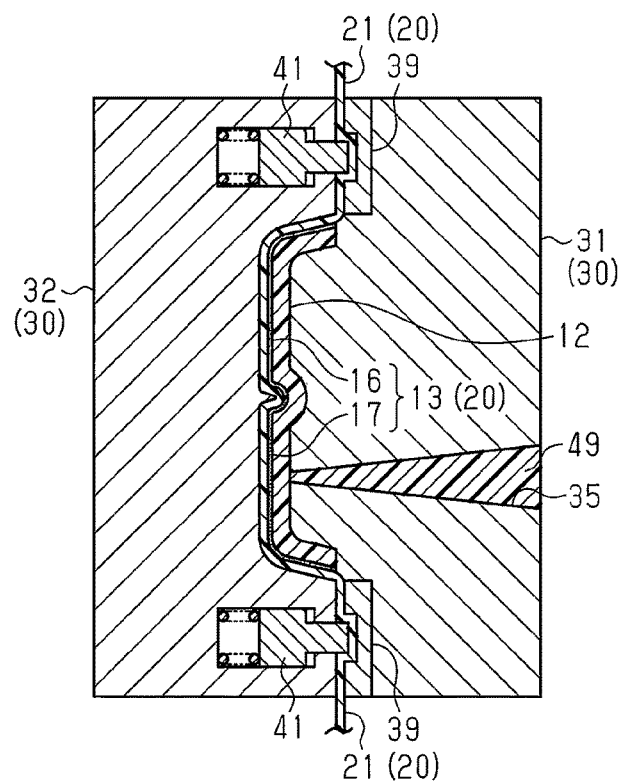
FIG. 14 is an explanatory cross-sectional view of the fifth step.

Thereafter, as shown in FIG. 14, molten plastic 49 is injected to the cavity 48 through the sprue gate 35. When the molten plastic 49 is cooled, the article body 12 with the groove portion 14 is molded. In the molding process, the heat of the molten plastic 49 and the pressure of injection cause the decorative design layer 13 to peel off from the base film 21 of the film 20. In the present embodiment, displacement of the film 20 relative to the molding surface 38 of the cavity block 32 is small. Thus, the decorative design layer 13 is transferred (fixed) onto the design surface 15 of the article body 12 with a high positional accuracy, so that the boundary 18 between the first and second design portions 16, 17, which are adjacent to each other, is located at a preset formation position on the article body 12 (the inner wall surface of the groove portion 14). Since this allows the decorative design layer 13 to be accurately arranged at a desired position on the decorative molded article 11, the accuracy of the formation position of the design on the design surface of the decorative molded article 11 is improved. In the present embodiment, the decorative molded article 11 is manufactured, in which the design surface of the article body 12 is decorated with the decorative design layer 13. The formation position of the decorative design layer 13 on the design surface is accurate.

<Demolding Step>

Figure 15:
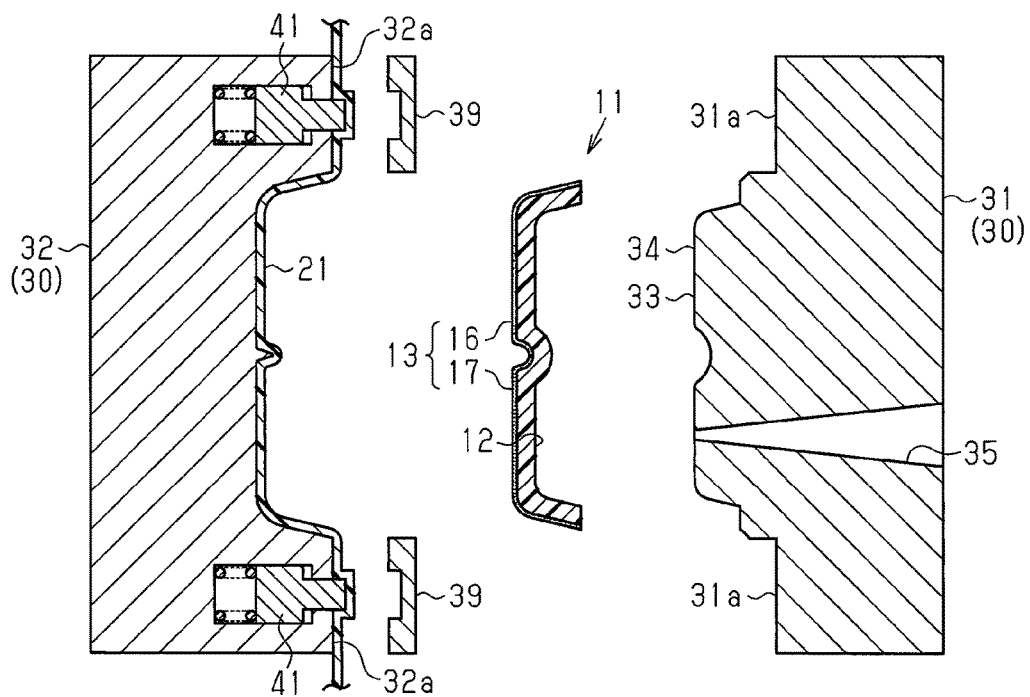
FIG. 15 is an explanatory cross-sectional view of a demolding step.

In the demolding step performed after the fifth step, as shown in FIG. 15, the cavity block 32 is moved away from the core block 31 to open the mold 30. Then, the decorative molded article 11 is removed from the mold 30. At this time, in preparation for the manufacture of the decorative molded article 11 in the next cycle, the clamp 39 is moved to a position away from the opposed surface 32a of the cavity block 32. Then, the winder 23 (refer to FIG. 3) winds (feeds) a predetermined length of the film 20, so that one cycle of manufacture of the decorative molded article 11 is terminated.

The present embodiment as described above achieves the following advantages.

(1) In the second step, when the film 20 is pushed to be deformed, the influence of the air filling the space 46 is reduced, so that the film 20 can be deformed in a desirable manner. This reduces displacement of the film 20 relative to the molding surface 38 of the cavity block 32. Further, since the molding of the film 20 through vacuum suction is properly performed in the fourth step, the film 20 can be formed into a desirable shape while reducing displacement of the film 20 relative to the molding surface 38 of the cavity block 32. This allows the decorative design layer 13 to be accurately arranged at a desired position on the decorative molded article 11, and the accuracy of the formation position of the design on the design surface of the decorative molded article 11 is improved.

(2) In the first step, the film 20 is tightly held by the distal ends of the securing pins 41 and the clamp 39 to secure the film 20 to the cavity block 32. Thus, at parts where the securing pins 41 are provided and the film 20 is tightly held (first portions), the distal ends of the securing pins 41 and the film 20 closely contact each other and no clearance is formed. In contrast, at parts where the securing pins 41 are not provided and the film 20 is not tightly held (second portions), the film 20 and the opposed surface 32a of the cavity block 32, which is opposed to the clamp 39, do not closely contact each other, and clearances are formed. When the film 20 is pushed in the subsequent second step, the air in the space 46 is discharged through these clearances.

Further, in the third step, the film 20 is tightly held by the opposed surface 32a of the cavity block 32 and the clamp 39 to secure the film 20 to the cavity block 32. Thus, the film 20 and the cavity block 32 closely contact each other over the entire periphery of the opening of the molding recess 36 of the cavity block 32 so that clearances are eliminated. At vacuum suction of the subsequent fourth step, air is restricted from flowing from the outside into the space 46 through clearances between the film 20 and the cavity block 32.

(3) The cavity block 32 has the springs 45, which always urge the securing pins 41 in a direction of increasing the projecting amount from the opposed surface 32a. In the first step, the relative positions of the cavity block 32 and the clamp 39 are set to the first securing positions, at which the distance between the opposed surface 32a of the cavity block 32 and the clamp 39 is greater than the thickness of the film 20, so that the projecting amount of the securing pins 41 from the opposed surface 32a is great. This allows the securing pins 41 to be pressed against the clamp 39 via the film 20 by the urging force of the springs 45, so that the film 20 is tightly held by the distal ends of the securing pins 41 and the clamp 39. At parts where the film 20 is not tightly held, clearances are formed between the film 20 and the cavity block 32.

In the third step, the relative positions of the cavity block 32 and the clamp 39 are set to the second securing positions, at which the distance between the opposed surface 32a of the cavity block 32 and the clamp 39 is smaller than the thickness of the film 20, so that the projecting amount of the securing pins 41 is smaller than that in the first step. Thus, the securing pins 41 are moved against the urging force of the springs 45 so that the film 20 is tightly held by the clamp 39 and the opposed surface 32a of the cavity block 32.

(4) The recesses 40, which have shapes allowing for entry and exit of the distal ends of the securing pins 41, are formed at positions in the clamp 39 against which the distal ends of the securing pins 41 abut with the film 20 in between. Thus, the position of the film 20 is reliably prevented from being displaced with respect to the cavity block 32. Also, the film 20 is reliably prevented from being displaced in the second step.

(5) Prior to the second step, the film 20 is heated in the heating step. Thus, the film 20 is stretched effortlessly by being pushed in the second step and being subjected to vacuum suction in the fourth step, so that the film 20 is caused to closely contact the molding surface 38 of the cavity block 32.

(6) The decorative molded article 11 is manufactured, in which the design surface 15 of the article body 12 is decorated with the decorative design layer 13. The formation position of the decorative design layer 13 on the design surface 15 is accurate.

The above-described embodiment may be modified as follows.

Contrary to the above illustrated embodiment, the cavity block 32 may be fixed and the core block 31 may be movable.

One of the cavity block 32 and the core block 31 may be fixed, and the other may be movable in the vertical direction to approach and separate from the fixed block.

The part on the molding surface 38 of the cavity block 32 against which the film 20 is pressed by the pushing portion 52 may be different from the position of the protrusion 37. Such a position includes a flat part on the molding surface 38. That is, the part where the film 20 is pushed by the pushing portion 52 may be any position as long as the film 20 can be received by the distal end of the pushing portion 52.

The decorative design layer 13 may be formed by a design portion of a single type or by design portions of three or more types.

In the third step, instead of moving the clamp 39 to the second securing position, the clamp 39 may be moved to a position at which the distance between the opposed surface 32a of the cavity block 32, which is opposed to the clamp 39, and the clamp 39 is equal to the thickness of the film 20 (the thickness T).

After the clamp 39 is moved, the distance between the clamp 39 and the opposed surface 32a of the cavity block 32 is equal to the thickness T. Thus, although the securing pins 41 are provided at positions in the cavity block 32 that are opposed to the clamp 39, the distal ends of the securing pins 41 are pushed by the clamp 39 with the film 20 in between, and the securing pins 41 enter the accommodation spaces 43 against the urging force of the springs 45. At this time, the projecting amount of each securing pin 41 from the opposed surface 32a is less than that in the first step (the state shown in FIG. 11B). Thus, the film 20 is tightly held by the clamp 39 and the opposed surface 32a of the cavity block 32. The film 20 closely contacts the cavity block 32 and the clamp 39 over the entire periphery of the opening of the molding recess 36 along the open end of the molding recess 36 of the cavity block 32. This seals the space 46 defined by the molding surface 38 of the cavity block 32 and the film 20.

The pushing portion 52, which pushes the film 20 against the protrusion 37 of the cavity block 32, may be replaced by a structure that deforms the film 20 to a position between the molding surface 38 and the position of the film 20 before being deformed. The shape of the pushing portion 52 may be changed to any shape as long as the pushing portion 52 is capable of pushing the film 20 to deform the film 20 in a direction approaching the molding surface 38 of the cavity block 32. Also, the core surface 34 of the core block 31 may be used as a pushing portion, which pushes the film 20. That is, any structure may be used as a pushing portion, which pushes the film 20, as long as such a structure has a shape that is capable of pushing the film 20 to deform the film 20 toward the molding surface 38 of the cavity block 32. This modification has the same advantages as the above items (1) to (6).

The manufacturing method of the above illustrated embodiment may be applied to manufacture a decorative molded article having no groove portion in the design surface.

If the film 20 can be effortlessly stretched in the second step and the fourth step by employing a stretchy film or a cavity block with a shallow molding recess, the heating step may be omitted.

The recesses 40 of the clamp 39 may be omitted so that the surface of the clamp 39 on the side facing the cavity is flat.

Figure 16:
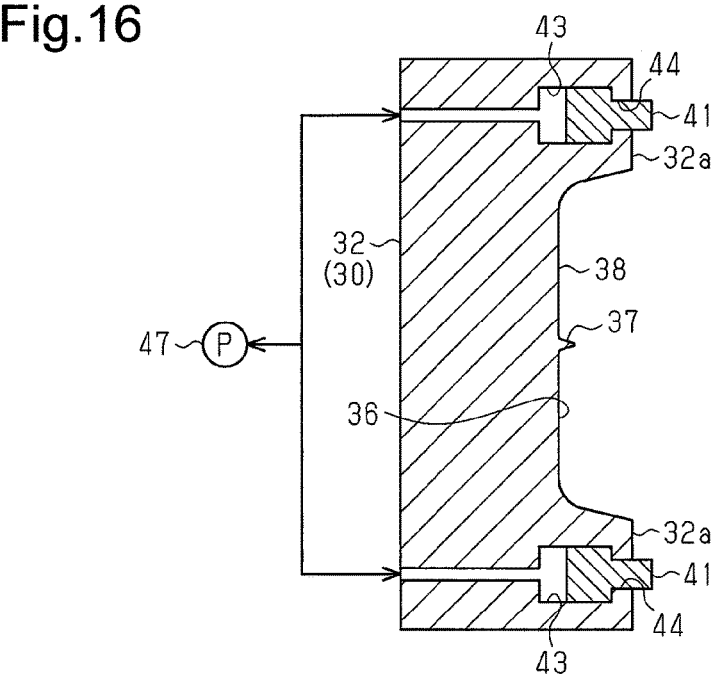
FIG. 16 is a cross-sectional view showing a cavity block used in a method for manufacturing a decorative molded article according to a modification.

As shown in FIG. 16, the springs 45 in the accommodation spaces 43 (refer to FIG. 3) may be omitted, and the accommodation spaces 43 may be connected to a fluid pump 47. When the fluid pump 47 is activated to either deliver fluid (such as air and oil) to or discharge fluid from the accommodation space 43, the projecting amount of the securing pins 41 from the opposed surface 32a of the cavity block 32 can be increased or reduced.

Figure 17A:
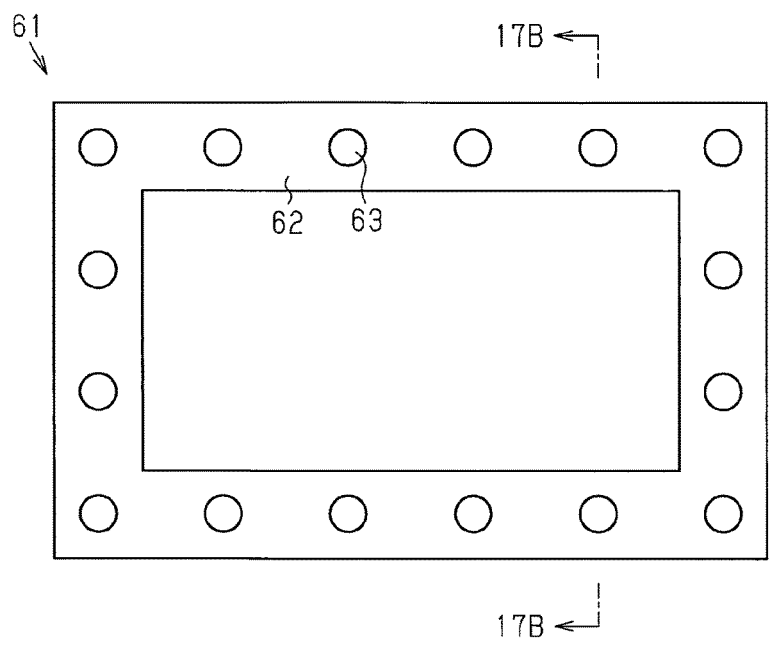
FIG. 17A is a side view showing a first clamp used in a method for manufacturing a decorative molded article according to another modification.
Figure 17B:
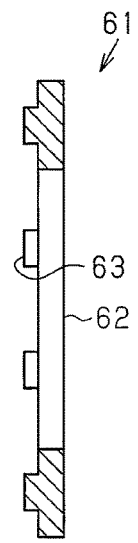
FIG. 17B is a cross-sectional view taken along line 17B-17B of FIG. 17A.
Figure 18A:
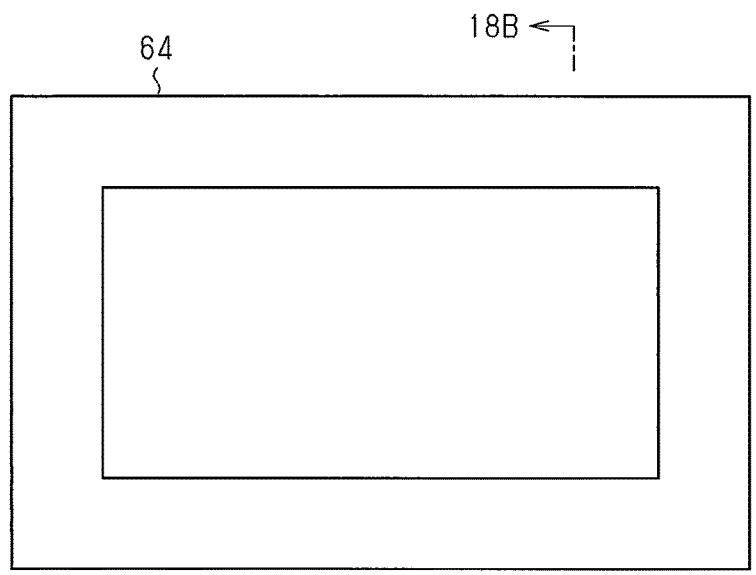
FIG. 18A is a side view showing a second clamp used in a method for manufacturing a decorative molded article according to the modification of FIG. 17A.
Figure 18B:
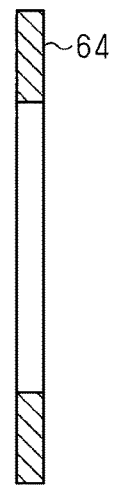
FIG. 18B is a cross-sectional view taken along line 18B-18B of FIG. 18A.

As clamps for securing the film 20 to the cavity block 32, a first clamp and a second clamp may be employed. Specifically, in the first step, the first clamp is used, which has an integrally formed projection at a portion facing the cavity block 32. In the third step, the second clamp is used, which does not have such a projection. In this case, the securing pins 41, the accommodation spaces 43, and the springs 45 in the cavity block 32 are omitted. For example, a first clamp 61 shown in FIGS. 17A and 17B may be provided, which includes a clamp body 62 and projections 63. The clamp body 62 has a rectangular loop-shaped structure forming the four sides of a rectangle. The projections 63 are arranged at intervals on a part of the clamp body 62 that is opposed to the cavity block 32. In the modification shown in FIGS. 17A and 17B, the number of the projection 63 is sixteen. A second clamp 64 shown in FIGS. 18A and 18B may be employed, which has a rectangular loop-shaped structure forming the four sides of a rectangle. The second clamp 64 does not have projections.

Even in this case, the film 20 is tightly held by the distal ends of the projections 63 of the first clamp 61 and the opposed surface 32a of the cavity block 32 (refer to FIG. 3), which is opposed to the first clamp 61, so that the film 20 is secured to the cavity block 32. At this time, at parts where the projections 63 are provided and the film 20 is tightly held, the opposed surface 32a of the cavity block 32 and the film 20 tightly contact each other, forming no clearance. In contrast, at parts where the projections 63 are not provided and the film 20 is not tightly held, the opposed surface 32a of the cavity block 32 and the film 20 do not tightly contact each other, forming clearances. When the film 20 is pushed in the second step, the air in the space 46 is discharged through these clearances.

Further, in the third step, the film 20 is tightly held by the opposed surface 32a of the cavity block 32 and the second clamp 64 to secure the film 20 to the cavity block 32. At this time, the film 20 and the cavity block 32 closely contact each other over the entire periphery of the opening of the molding recess 36 of the cavity block 32 so that clearances are eliminated. At vacuum suction of the fourth step, air is restricted from flowing from the outside into the space 46 through clearances between the film 20 and the cavity block 32.

Figure 19A:
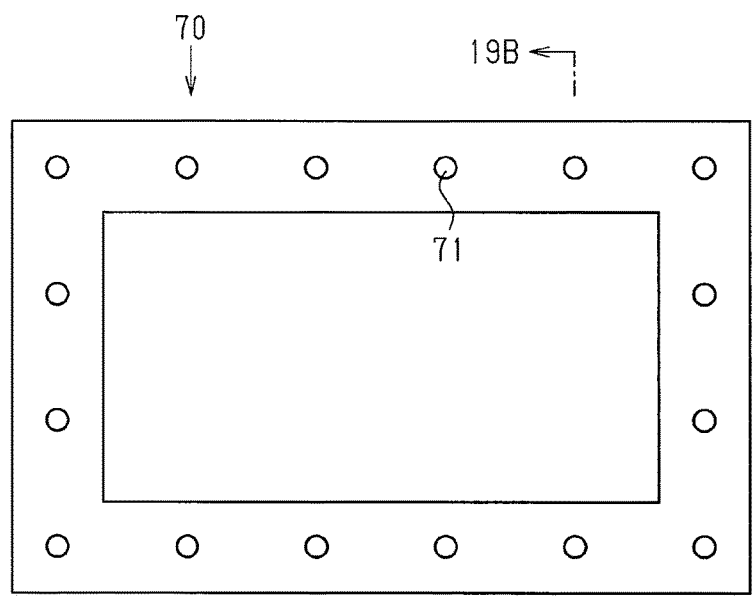
FIG. 19A is a side view showing a clamp used in a method for manufacturing a decorative molded article according to another modification.
Figure 19B:
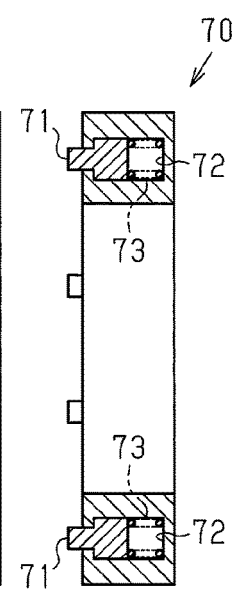
FIG. 19B is a cross-sectional view taken along line 19B-19B of FIG. 19A.

Instead of employing the cavity block 32, which is provided with the securing pins 41, the accommodation spaces 43, and the springs 45, a clamp 70 shown in FIGS. 19A and 19B may be employed, which is provided with securing pins 71, accommodation spaces 72, and springs 73.

This modification achieves advantages that are equivalent to the advantages as the above items (1) to (3).

The above illustrated method for manufacturing a decorative molded article is not limited to a method for manufacturing the decorative molded article 11 through the in-mold decoration method, in which the decorative design layer 13 is transferred to the article body 12. That is, the above illustrated method may be applied to a method for manufacturing a decorative molded article through a film insert molding method, in which a film formed by a base film and a decorative design layer is molded integrally with an article body. Also, the manufacturing method of the above illustrated embodiment may be applied to a method for manufacturing a decorative molded article by vacuum-molding a plastic sheet made of a base film and a decorative design layer. That is, the above illustrated method for manufacturing a decorative molded article may be applied to any manufacturing method that includes a step for molding a plastic sheet by causing the plastic sheet to closely contact the molding surface of a cavity block through vacuum suction, and a step for pushing the plastic sheet to deform the plastic sheet toward the molding surface of the cavity block.

The above illustrated method for manufacturing a decorative molded article is not limited to a method for manufacturing an interior part for vehicles, but may be applied to any method for manufacturing various types of plastic molded articles used in vehicles. Further, the above illustrated manufacturing method may be applied to areas other than vehicles. For example, the above illustrated method may be applied to manufacture various types of plastic molded articles such as parts for electrical appliances, miscellaneous goods, and daily commodities.

The invention claimed is:

1. A method for manufacturing a decorative molded article that has a decorative design surface by using:
   a plastic sheet having a decorative portion;
   a mold including a cavity block with a molding recess and a securing member configured to secure the plastic sheet to the cavity block, the molding recess of the cavity block including an inner surface and a protrusion projecting away from the inner surface of the molding recess, the inner wall surface of the molding recess including the protrusion being a molding surface;
   a movable member including a pushing portion having a distal end protruding toward the protrusion of the cavity block;
   the method comprising:
   a first step for positioning the plastic sheet at a preset position covering an opening of the molding recess and securing the plastic sheet to the cavity block wherein the plastic sheet is positioned and secured by first portions of the plastic sheet being tightly held by the cavity block and the securing member, second portions of the plastic sheet are not tightly held by the cavity block and the securing member, the first portions and the second portions of the plastic sheet being arranged along an open end of the molding recess;
   a second step for pushing the plastic sheet to deform the plastic sheet toward the molding surface of the cavity block, the second step including:
      moving the movable member toward the cavity block, thereby pushing the plastic sheet by the distal end of the pushing portion to deform the plastic sheet toward the molding surface of the cavity block, and pressing the plastic sheet against the protrusion by the distal end of the pushing portion;
   a third step for securing the plastic sheet to the cavity block in a state in which the plastic sheet is tightly held by the cavity block and the securing member over an entire periphery of the opening of the molding recess along the open end of the molding recess; and
   a fourth step for molding the plastic sheet by causing the plastic sheet to closely contact the molding surface of the cavity block through vacuum suction.

2. The method for manufacturing a decorative molded article according to claim 1, wherein
   the securing member has a shape such that, when the plastic sheet is tightly held by the securing member and the cavity block, the securing member surrounds the entire periphery of the opening of the molding recess along the open end of the molding recess,
   the cavity block includes an opposed surface, which is opposed to the securing member, a plurality of accommodation spaces, which are provided at a part of an opening periphery of the molding recess that is opposed to the securing member, a plurality of communication holes, each of which opens in the opposed surface and connects an inside of a corresponding one of the accommodation spaces with an outside of the accommodation space, and a plurality of securing pins, each of which is accommodated in a corresponding one of the accommodation spaces, wherein a distal end of each securing pin protrudes to the outside of the corresponding accommodation space via the corresponding communication hole, a projecting amount of each securing pin from the opposed surface is changeable, and the securing pins are arranged at intervals along the open end of the molding recess,
   in the first step, the plastic sheet is secured to the cavity block by tightly holding the plastic sheet by distal ends of the securing pins and the securing member in a state in which the projecting amount of the securing pins from the opposed surface is great, and
   in the third step, the plastic sheet is secured to the cavity block by tightly holding the plastic sheet by the opposed surface of the cavity block and the securing member in a state in which the projecting amount of the securing pins from the opposed surface is smaller than that in the first step.

3. The method for manufacturing a decorative molded article according to claim 2, wherein
   the cavity block includes urging members, each of which is accommodated in a corresponding one of the accommodation spaces and always urges the corresponding securing pin in a direction of increasing the projecting amount of the securing pin from the opposed surface,
   in the first step, relative positions of the cavity block and the securing member are set to positions where a distance between the opposed surface of the cavity block and the securing member is greater than a thickness of the plastic sheet, so that the projecting amount of the securing pins is great, and
   in the third step, the relative positions of the cavity block and the securing member are set to positions where the distance between the opposed surface of the cavity block and the securing member is less than or equal to the thickness of the plastic sheet, so that the projecting amount of the securing pins from the opposed surface is less than that in the first step.

4. The method for manufacturing a decorative molded article according to claim 2, wherein the securing member includes a plurality of recesses, each of the recesses includes a bottom against which a corresponding one of the securing pins abuts with the plastic sheet in between, and each of the recesses has a shape that allows the distal end of the corresponding securing pin to enter and exit the recess.

5. The method for manufacturing a decorative molded article according to claim 1, further comprising a heating step for heating the plastic sheet prior to the second step.

6. The method for manufacturing a decorative molded article according to claim 1, wherein the mold includes a core block, the plastic sheet is a film that includes a base film and a decorative design layer formed on the base film, the method further comprises a fifth step, and in the fifth step, a molten plastic is injected into a cavity defined in the mold in a clamped state between the film and a core surface of the core block to mold an article body, and the decorative design layer of the film is fixed to a design surface of the article body.

7. A method for manufacturing a decorative molded article that has a decorative design surface by using:

a plastic sheet having a decorative portion;

a mold comprising a cavity block with a molding recess and a securing member configured to secure the plastic sheet to the cavity block, the molding recess of the cavity block including an inner surface and a protrusion projecting away from the inner surface of the molding recess, the inner wall surface of the molding recess including the protrusion being a molding surface; and a movable member including a pushing portion having a distal end protruding toward the protrusion and configured to move toward the protrusion, and the method comprising:

a first step of positioning the plastic sheet at a preset position and covering an opening of the molding recess and securing the plastic sheet to the cavity block with first portions of the plastic sheet being tightly held between the cavity block and the securing member and second portions not being tightly held by the cavity block and the securing member, the first portions and the second portions being arranged along an open end of the molding recess;

a second step of pushing the plastic sheet toward the molding surface of the cavity block by moving the movable member toward the cavity block and pushing the plastic sheet by the distal end of the pushing portion to deform the plastic sheet toward the molding surface of the cavity block until the plastic sheet is pressed against the protrusion by the distal end of the pushing portion;

a third step of securing the plastic sheet to the cavity block in a state in which the plastic sheet is tightly held by the cavity block and the securing member over an entire periphery of the opening of the molding recess along the open end of the molding recess; and a fourth step of molding the plastic sheet by causing the plastic sheet to closely contact the molding surface of the cavity block through vacuum suction.

* * * * *